J. T. GILMER.
SAP OR GUM EXTRACTOR.
APPLICATION FILED MAR. 21, 1908.
907,778.
Patented Dec. 29, 1908.
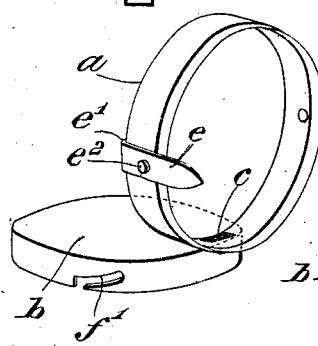
Fig. 4.
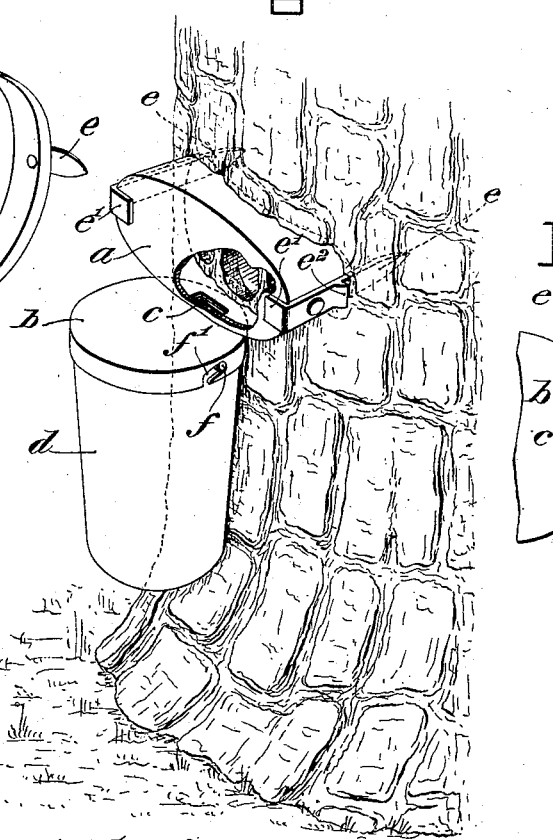
Fig. 1.
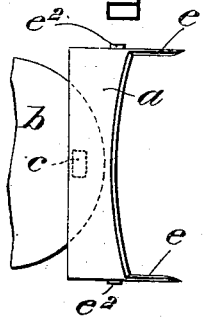
Fig. 3.
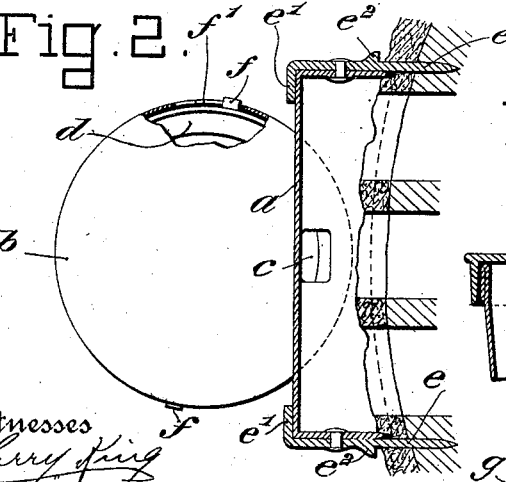
Fig. 2.
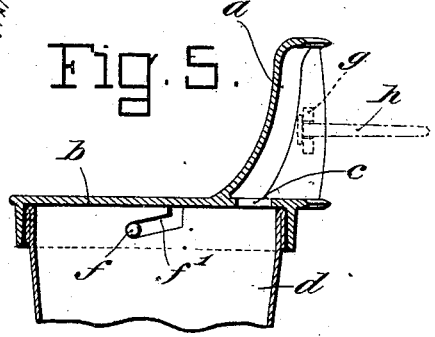
Fig. 5.
Fig. 6.
Witnesses
Harry King
Edward R. Whitman
Inventor
John T. Gilmer
By
Julian C. Dowell
his Attorneys
THE NORRIS PETERS CO., WASHINGTON, D. C.

UNITED STATES PATENT OFFICE.

JOHN THORNTON GILMER, OF PENSACOLA, FLORIDA, ASSIGNOR OF ONE-HALF TO GREEN U. HARRIS, OF NEW ORLEANS, LOUISIANA.

SAP OR GUM EXTRACTOR.

No. 907,778.	Specification of Letters Patent.	Patented Dec. 29, 1908.

Application filed March 21, 1908. Serial No. 422,560.

*To all whom it may concern:*

Be it known that I, JOHN T. GILMER, a citizen of the United States, residing at Pensacola, in the county of Escambia and State of Florida, have invented certain new and useful Improvements in Sap or Gum Extractors; and I do hereby declare the following to be a full, clear, and exact description of the invention, such as will enable others skilled in the art to which it appertains to make and use the same.

This invention relates to devices for use in extracting sap or gum from pine and other gummiferous trees, including maple and rubber, but more especially for collecting gum from pine trees for the production of rosin and turpentine.

The invention refers more particularly to that kind of sap or gum extractor having a cap adapted for fastening over a tap hole and provided with a cover for a depending vessel into which the sap or gum exuding from the tap hole is discharged through a passage from said cap. The employment of this kind of extractor avoids the scarification of the trees incident to the former method of boxing, hacking and scraping; it houses and protects the tap hole and provides for collection of the sap or gum without exposure to the air or weather, thus preventing congestion of the pores of the wood by cold or frost and promoting the free flow or exudence of the sap or gum as well as protecting it from rain, dirt and the like, while also eliminating the usual wastage due to overflow, evaporation and drying or the washing away of soft gum by rain; so that a larger quantity of gum can be recovered and of a better and purer quality.

The present invention is an improvement on the sap or gum extractor set forth and claimed in my Patent No. 858,380, dated July 2, 1907; and its objects are to simplify and improve the construction and increase the practicability, efficiency and convenience of sap or gum extractors of the character above stated.

The invention will hereinafter be first fully described by reference to the accompanying drawings, which form a part of this specification, and then more particularly pointed out in the claims at the end of the description.

In said drawings, wherein corresponding parts in the several figures are denoted by the same reference symbols: Figure 1 is a perspective view of a device embodying my invention, shown applied to a pine tree, a portion of the cap which covers the tap hole or holes being broken away. Fig. 2 is an enlarged horizontal section through the cap which covers the tap hole, showing the cover for the collecting vessel in plan view and with a portion broken away. Fig. 3 is a smaller plan view of a modified form of the device. Fig. 4 is a perspective view of another form of the device. Fig. 5 is a central vertical section of another form of the device. Fig. 6 is a detail of Fig. 5.

In the drawings, $a$ denotes a cap adapted to be fastened as a cover over a tap hole or holes in the tree to be sapped; and $b$ denotes a cover for a collecting vessel made as a foot plate of said cap.

As shown in Figs. 1 to 4 inclusive, the cap $a$ and cover $b$ are joined directly together at their rim portions substantially in the form of a right angle, though the angle may be more or less varied. The rim or flange of the cap $a$ projects rearwardly beyond the edge of the cover $b$, so as to allow the cap to set against the side of the tree while the cover $b$ and its attached collecting vessel will be offset forwardly. At the same time, the rim of the cap $a$ is set sufficiently on the marginal portion of the top of said cover $b$ to provide through the juncture of the parts an inlet orifice $c$ for discharge of sap or gum from the cap into the collecting vessel $d$. The parts may be joined by riveting, soldering or other appropriate means, or they may be formed as an integral structure. Both parts are or may be made of sheet-metal, preferably galvanized sheet-iron of sufficient thickness to provide a stiff strong construction adapted for the rough usage to which such devices are ordinarily subjected.

A preferred form of the cap $a$ is shown in Figs. 1, 2 and 3. Here the cap is substantially elliptical in shape, disposed with its longer axis horizontally; and the top and bottom edges of its rim or flange are formed on a concave curve, thus conforming the rear open face of the cap to the curvature of a tree. This shape renders the device particularly adaptable for young trees having a thin bark, since it avoids the necessity of first shaving or planing off the bark to provide a flat seat for the cap. The planing of such a flat surface may often require going into the wood, thus scarring the side of the tree and causing the flow of exposed sap, which is to be avoided. Another advantage of the elliptical form of the cap is that it will cover a plurality of holes or openings bored side by side in the trunk of the tree, thus increasing the tapping capacity of the apparatus. Fig. 4 however shows a round cap, which is adapted for use on a large tree or where the bark is of sufficient thickness to permit planing off a flat surface to receive said cap.

For fastening the cap to the tree, its flange or rim is provided with prongs or spikes e, preferably a pair arranged respectively at the right and left hand sides. In applying the device, the prongs are simply driven into the wood until the edge of the rim of the cap cuts into the bark far enough to exclude the air, the said edge being preferably sharpened. This makes a very quick and easy mode of attaching the device on the tree.

Where the cap is made of sheet-metal, the said prongs e consist preferably of separate iron spikes riveted or otherwise attached to the opposite sides of the cap, and having their outer ends angled over the back of the cap as indicated at e'. This enables the spikes to be driven into the wood by a hammer without danger of bending or misshaping the cap. But if the sheet-metal is of sufficient thickness and strength, the prongs may be made as integral projections from the rim of the cap, as in Fig. 3. The prongs are provided with lateral lugs $e^2$ whereby they may be pried out from the wood by the nose of a hammer or other device for detaching the cap from the tree.

The collecting vessel d is attached to and supported from its cover b by lugs or studs f projecting oppositely from the top portion of said vessel and engaging in bayonet-slots f' in the rim or depending flange of the cover. These slots f' are given an upward inclination, so that when the lugs are inserted therein and the vessel given a turn to attach it, the top of the vessel will be drawn tightly against the bottom of the cover b, to provide a substantially air-tight closure. Any suitable gasket may be interposed between the cover and the rim of the vessel.

The operation will be clearly understood by those familiar with the art, and is apparent from the drawings in connection with the foregoing description. In the tree to be sapped, one or more tap holes are bored, of such size that the area covered thereby may be inclosed by the cap a, which is then applied over said hole or holes by driving in its spikes or prongs e until the cutting edge of the rim of the cap embeds in the bark, thus making a substantially air-tight housing. The collecting vessel d is then placed under and attached to the cover b, and the device is left to collect the sap or gum which exudes from the tapped hole or holes in the tree and discharges through the orifice c into the collecting vessel. When the vessel is substantially filled, it can be easily detached by disengaging its lugs f from the bayonet-slots f', and another vessel can be substituted for it, or the same vessel can be emptied and restored to its position.

In Figs. 5 and 6 I have illustrated a modified construction, wherein the cap a and cover b are made integrally of malleable cast-iron or other metal; the cover b being provided with the inlet orifice c near its marginal portion and constructed with the cap a rising above said orifice and having its rim off-set behind the rim of the cover. In this construction, the studs f are formed on the inside of the depending flange of the cover b, and engage in the bayonet-slots f' formed in the top portion of the vessel; said slots being given a downward inclination which accomplishes the same purpose of drawing the vessel d tightly to the cover when the vessel is attached. The opposite sides of the cap a are formed with bifurcated lugs or ears g through which nails h can be passed and driven into the wood for fastening the cap to the tree.

Having thus described my invention, what I claim as new and desire to secure by Letters Patent of the United States is:

1. A sap or gum extractor comprising a closure for a collecting vessel having an inlet orifice in its marginal portion and constructed thereover with a substantially upright rearwardly-facing cap having an offset rear edge and adapted to be fastened to a tree as a cover for a tap-hole.

2. A sap or gum extractor comprising a cap for fastening over a tap-hole and a cover for a collecting vessel, said cap and cover being directly joined at their marginal portions in the form of an angle and having an orifice for passage of sap or gum formed through their juncture.

3. A sap or gum extractor comprising a cap for fastening over a tap-hole or holes provided with a forwardly projecting cover for a collecting vessel and having a passage therethrough, said cap being substantially elliptical in form with its longer axis disposed horizontally and having its rim curved inwardly at the top and bottom to conform approximately to the curvature of a tree.

4. A sap or gum extractor comprising a cap adapted to be applied as a cover over a tap-hole and provided with rigid prongs for driving in the tree, and a cover for a collecting vessel attached to said cap and having a passage therethrough in communication with the interior of said cap.

5. A sap or gum extractor comprising a cap adapted to be applied as a cover over a tap-hole and provided with spikes or prongs for driving into the tree, said prongs having lateral lugs for prying them out of the wood, and a cover for a collecting vessel attached to said cap, there being a passage from said cap through said cover for discharge of sap or gum.

6. A sap or gum extractor comprising a cap for fastening over a tap-hole provided with a forwardly-offset foot-plate serving as a cover for a collecting vessel, there being a passage from said cap through said cover, said cover having a depending flange or rim, and a collecting vessel attached to and supported by said flange by means of lugs on the one part engaging bayonet-slots in the other part, said slots being inclined in a direction for drawing the vessel to the cover.

In testimony whereof I affix my signature, in presence of two witnesses.

JOHN THORNTON GILMER.

Witnesses:
 C. N. HORNE,
 HENRY WESTER.